United States Patent [19]
Hillsberg et al.

[11] Patent Number: 5,619,968
[45] Date of Patent: Apr. 15, 1997

[54] ELECTRONIC IGNITION SYSTEM WITH PRE-IGNITION PREVENTION APPARATUS AND METHOD

[75] Inventors: Mitchell C. Hillsberg, Burlington; Paul J. Rothman, Windsor, both of Conn.

[73] Assignee: United Technologies Corporation, Windsor Locks, Conn.

[21] Appl. No.: 282,422

[22] Filed: Jul. 28, 1994

[51] Int. Cl.⁶ .................................................. F02P 3/055
[52] U.S. Cl. ........................ 123/417; 123/609; 123/630
[58] Field of Search ............................ 123/406, 414–417, 123/609, 630, 640, 643

[56] References Cited

U.S. PATENT DOCUMENTS

| | | | |
|---|---|---|---|
| 4,112,895 | 9/1978 | Habert | 123/418 |
| 4,245,591 | 1/1981 | Nishida et al. | 123/416 |
| 4,409,931 | 10/1983 | Lindberg | 123/25 R |
| 4,520,781 | 6/1985 | Nishida | 123/414 |
| 4,665,884 | 5/1987 | Yoshida et al. | 123/609 |
| 5,014,669 | 5/1991 | Takasaki et al. | 123/643 |
| 5,027,774 | 7/1991 | Dutkiewicz et al. | 123/425 |
| 5,211,138 | 5/1993 | Murray et al. | 123/44 B |
| 5,213,067 | 5/1993 | Kramer | 123/51 BA |
| 5,228,294 | 7/1993 | Murray | 60/709 |

FOREIGN PATENT DOCUMENTS

| | | |
|---|---|---|
| 0244830 | 11/1987 | European Pat. Off. . |
| 0494467 | 7/1992 | European Pat. Off. . |
| 4004516 | 8/1991 | Germany . |

*Primary Examiner*—Andrew M. Dolinar

[57] ABSTRACT

An electronic ignition system for a reciprocating engine includes a pre-ignition prevention control sub-system which acts as an independent monitor system to ensure the ignition system can only command a spark plug to fire when the next cylinder to fire is outside its pre-ignition zone. The pre-ignition prevention sub-system is independent from the circuitry which commands the spark plug to fire to ensure a single point failure of the system can not lead to a controller erroneously commanding a spark plug to fire in the pre-ignition prevention sub-system. An advantage of the present invention is the increased safety the pre-ignition prevention sub-system provides to the engine by significantly reducing the likelihood that fuel/air mixture within a cylinder will be ignited prematurely.

13 Claims, 8 Drawing Sheets

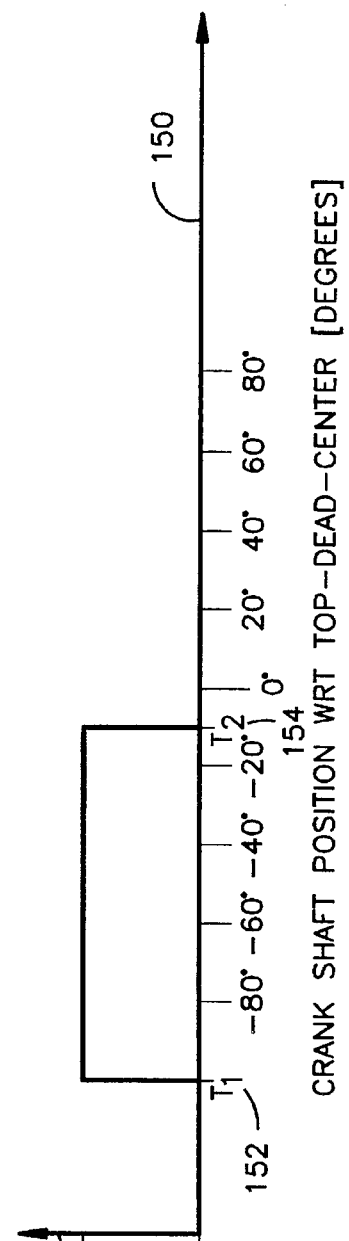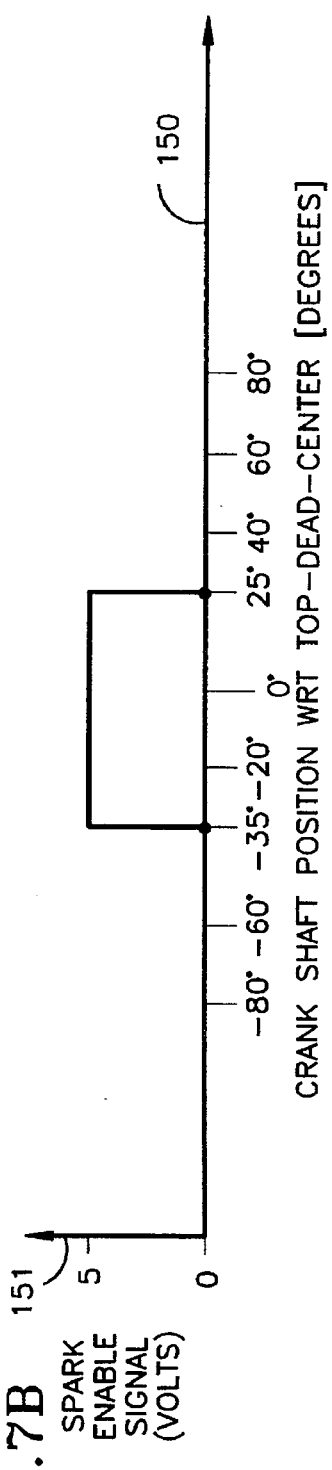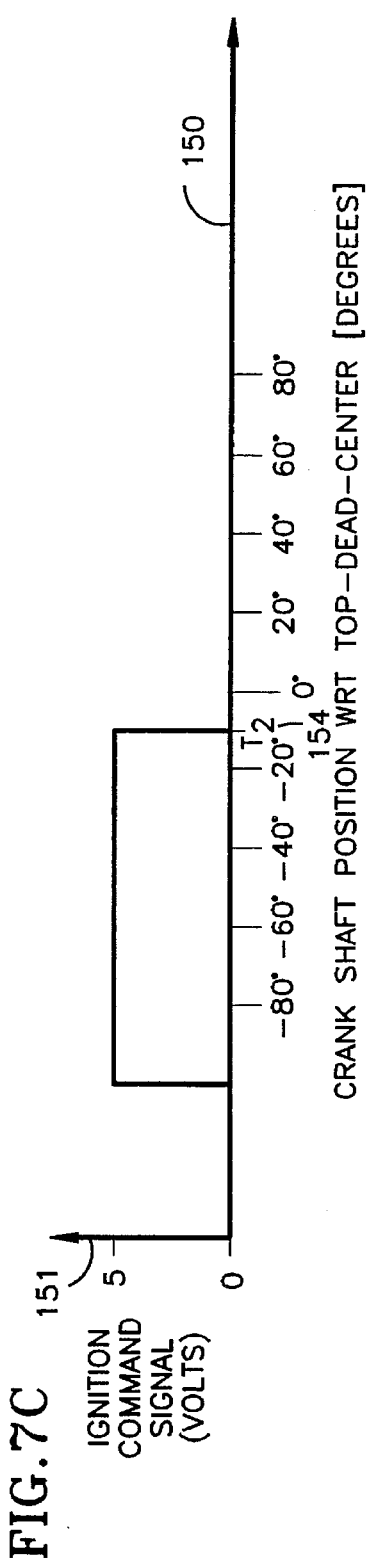

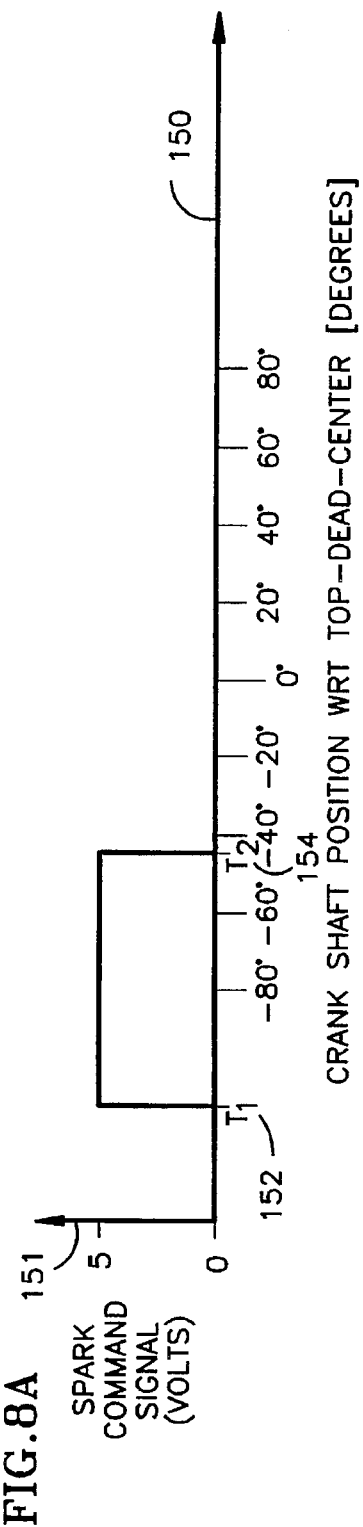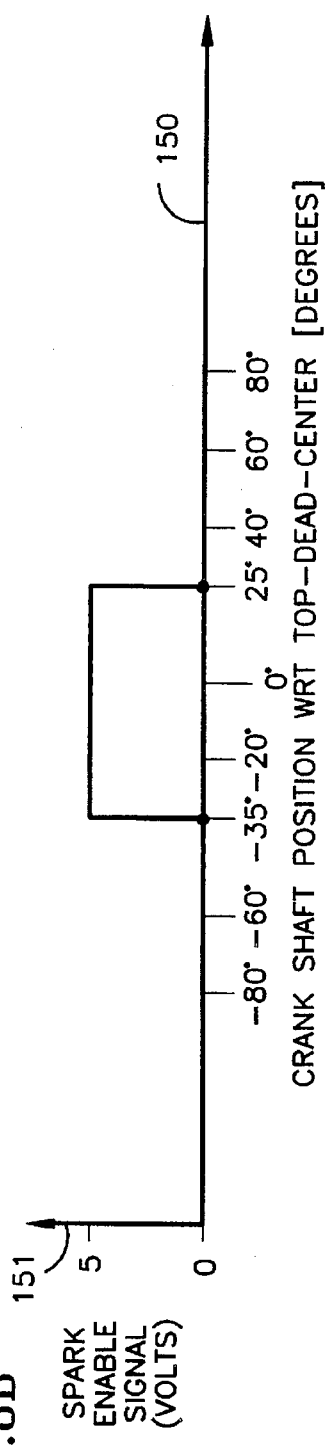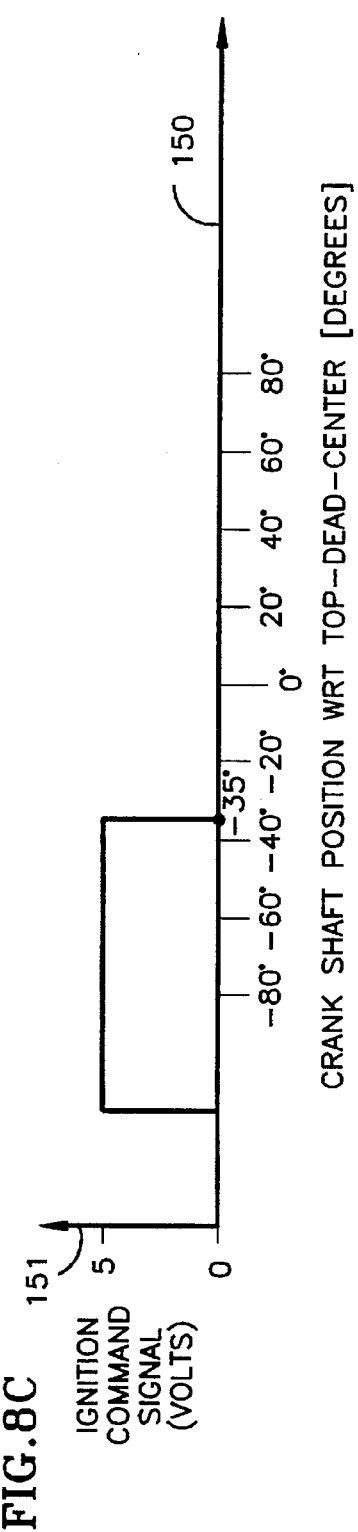

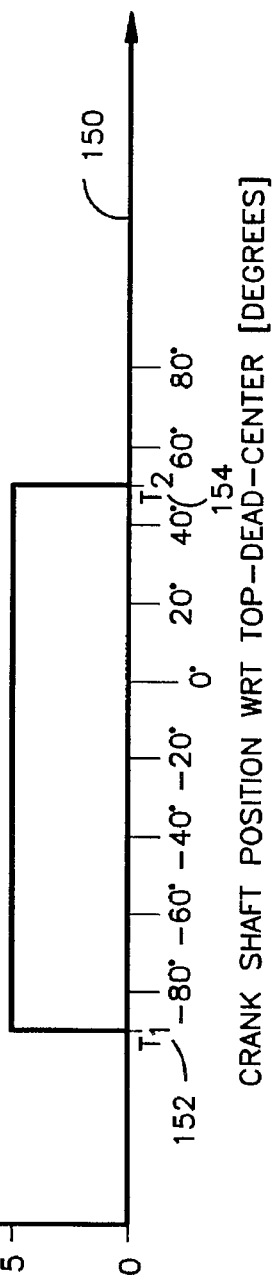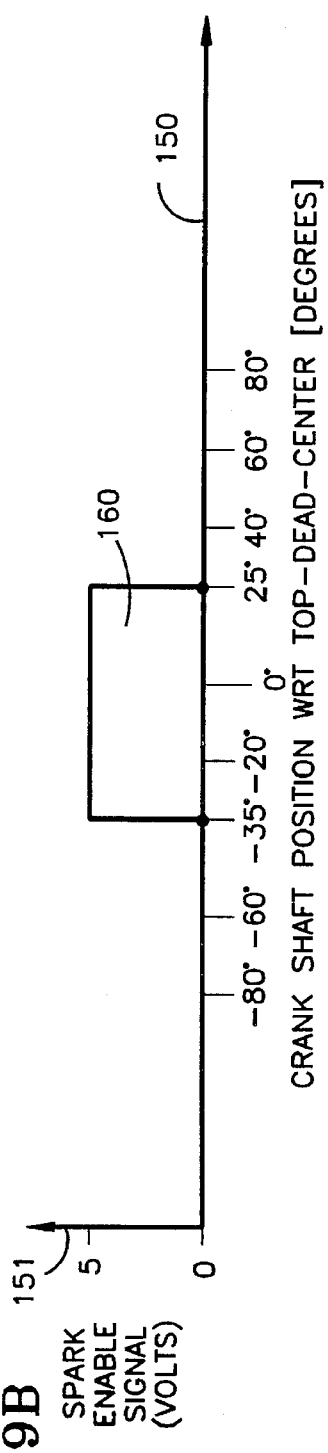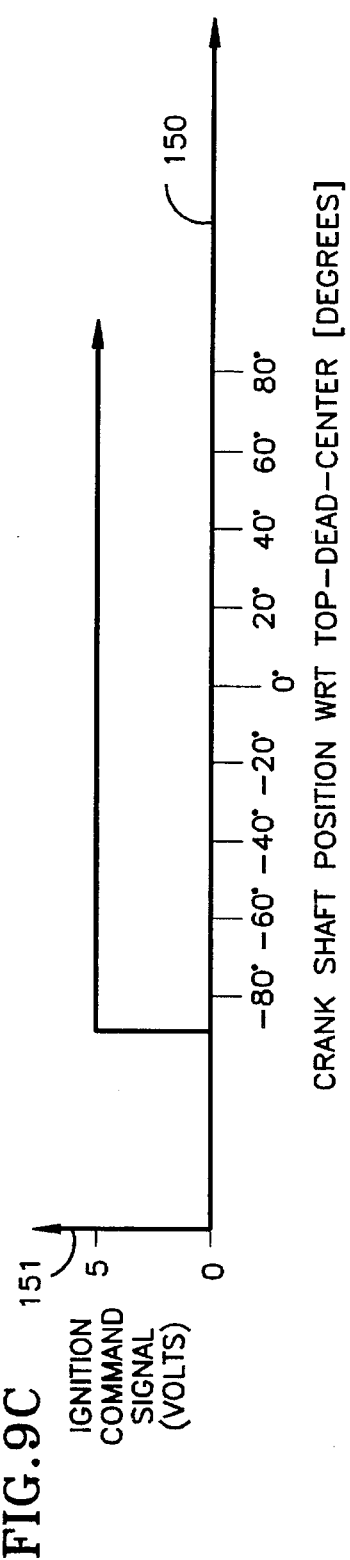

5,619,968

ELECTRONIC IGNITION SYSTEM WITH PRE-IGNITION PREVENTION APPARATUS AND METHOD

TECHNICAL FIELD

This invention relates to an ignition system and more particularly to a pre-ignition prevention control system for a reciprocating engine.

BACKGROUND ART

An ignition control system for a multi-cylinder reciprocating engine controls the ignition function of the engine and more particularly determine both the dwell and spark times of the ignition system. The dwell time determines how much energy is to be stored in a coil and subsequently discharged to the spark plug. The spark time determines when the energy will be discharged from the coil into the spark plug to ignite the fuel/air mixture within the cylinder.

Early automobile ignition control systems utilized a mechanical system which included a single spark distribution system (e.g., a magneto and associated mechanical distribution hardware) and a single spark plug per cylinder. Historically, these systems were plagued by reliability problems with the spark distribution system. In addition, these systems are susceptible to mechanical failures which led to reduced engine performance based on excessive normal wear and tear and in the most severe case destruction of the engine. These mechanical systems were also generally limited to working with constant, non-adjustable dwell time and limited authority over the spark time.

With the advent of the single chip microprocessor, electronic control systems replaced mechanical systems as the system of choice for controlling the ignition of high performance reciprocating engines. Unlike a mechanical ignition control system which provides a constant non-adjustable dwell time and spark time, an electronic ignition control system may adjust both the dwell and spark times as a function of the engine operating conditions and ambient conditions to achieve improved engine performance and efficiency. As an example, the electronic control may either advance or retard the spark time from its nominal spark time as a function of varying engine operating parameters and ambient conditions (e.g. engine speed, ambient pressure and temperature, etc. . . . ).

Any new aircraft system that relates to engine control and flight safety must be certified by the Federal Aviation Administration (FAA) to ensure the system is reliable. In an aircraft reciprocating engine, an event of concern to the FAA is the likelihood of sustained pre-ignition which occurs when the fuel/air mixture within the cylinder is ignited prematurely. Conceivably, pre-ignition could occur as a result of a failure in the ignition control system (e.g., a single point failure in the microprocessor) which leads to an improper series of spark commands to the spark plugs. Sustained pre-ignition may lead to increased temperature within an engine cylinder, which through a series of subsequent events could lead to an aircraft engine fire. To ensure such an event does not happen, the ignition control system must have sufficient reliability to ensure the probability of pre-ignition is less than one in a billion.

DISCLOSURE OF THE INVENTION

An object of the present invention is to prevent pre-ignition in a reciprocating engine.

According to the present invention, an electronic ignition system includes an ignition control sub-system, a pre-ignition prevention sub-system and a separate ignition module for each cylinder, wherein the pre-ignition prevention sub-system is independent from the ignition control sub-system and determines when an ignition command signal can be issued to ignite the fuel/air mixture within the next engine cylinder; the pre-ignition prevention sub-system acts as an independent watchdog on the ignition control sub-system to ensure the ignition control sub-system only commands a spark when the cylinder is within a valid ignition window.

An advantage of the present invention is the increased safety the pre-ignition prevention sub-system provides to the engine by significantly reducing the likelihood that fuel/air mixture within a cylinder will be ignited prematurely. That is, the apparatus and method of the present invention significantly reduces the probability of pre-ignition by ensuring that the engine spark plugs within a certain zone referred to herein as the ignition window.

These and other objects, features and advantages of the present invention will become more apparent in light of the following detailed description of an exemplary embodiment thereof as illustrated in the accompanying drawings.

BRIEF DESCRIPTION OF THE DRAWINGS

FIGS. 7(A)–9(C) are plots of various signals within the system demonstrating the operation of the present invention.

BEST MODE FOR CARRYING OUT THE INVENTION

Figure 1:
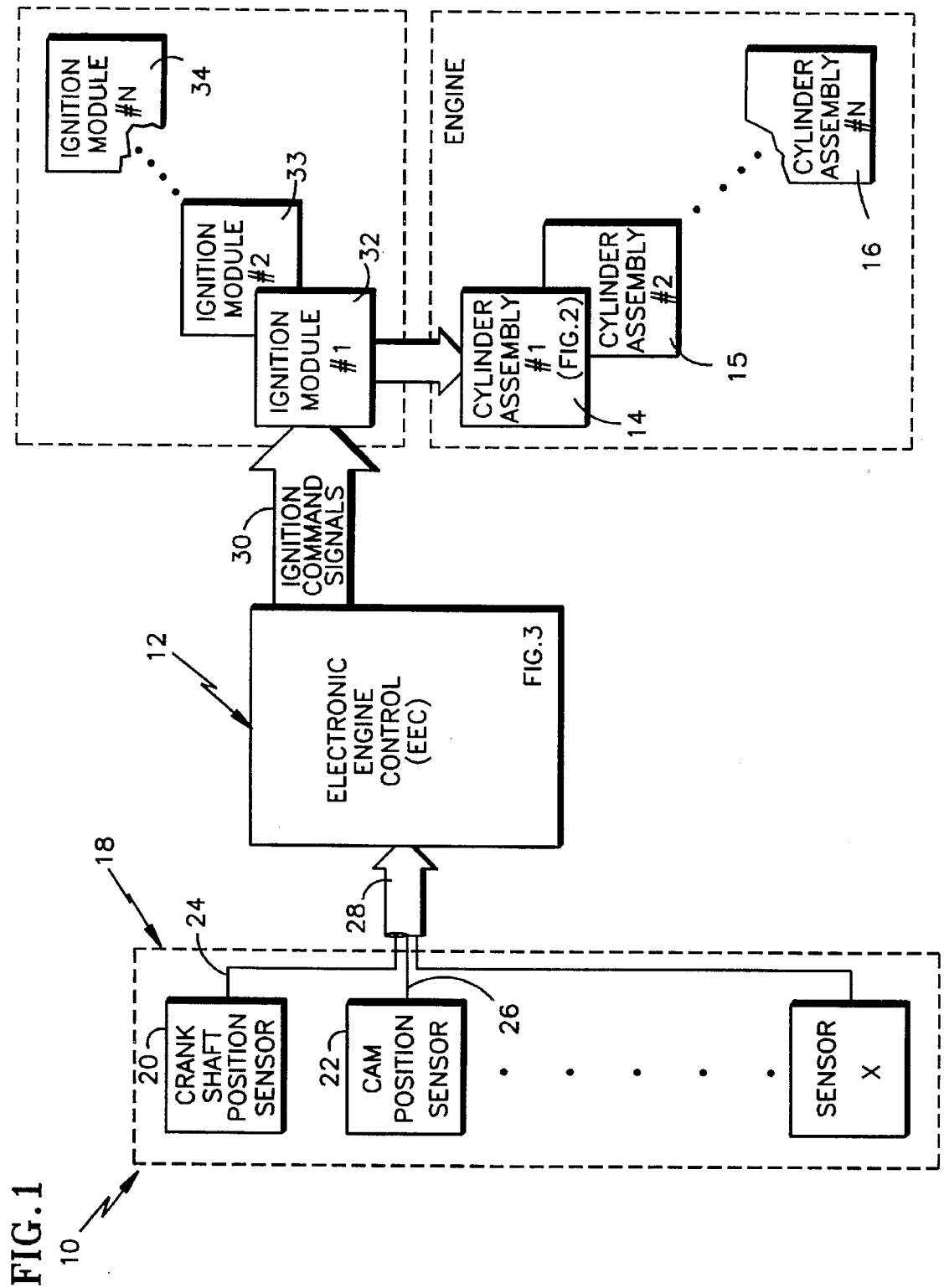
FIG. 1 is an illustration of a system block diagram of an electronic ignition system for a reciprocating engine.

FIG. 1 illustrates an the electronic ignition system 10 which includes an electronic engine control (EEC) 12 that controls the ignition of a plurality of engine cylinders 14, 15 and 16 in response to signals from a plurality of aircraft and engine sensors 18 including an crank shaft position sensor 20 and engine cam shall position sensor 22. The crank shaft position sensor 20 provides a position signal on a line 24 and the cam shaft position sensor 22 provides a cam shall position signal on a line 26 which are input to a signal bus 28. The EEC 12 processes the signal values received via the signal bus 28 and provides a plurality of ignition command signals via an output command bus 30 to a plurality of ignition modules 32, 33 and 34. Both the crank shaft position sensor and the cam shaft position sensor are generally well known rod type inductive sensors which sense passing teeth on the crank and cam shafts. Each cylinder has its own associated ignition module which a contains a power switching FET that controls the application of a charging voltage to the cylinder assembly which includes an ignition coil. For an eight cylinder engine there would be eight ignition modules; one for each cylinder. In a controlled sequence, the EEC 12 charges the coil of the next cylinder assembly to fire. Once the coil is charged with enough energy, the energy in the coil is rapidly discharged into the spark plug which ignites the fuel/air mixture in the cylinder.

Figure 2:
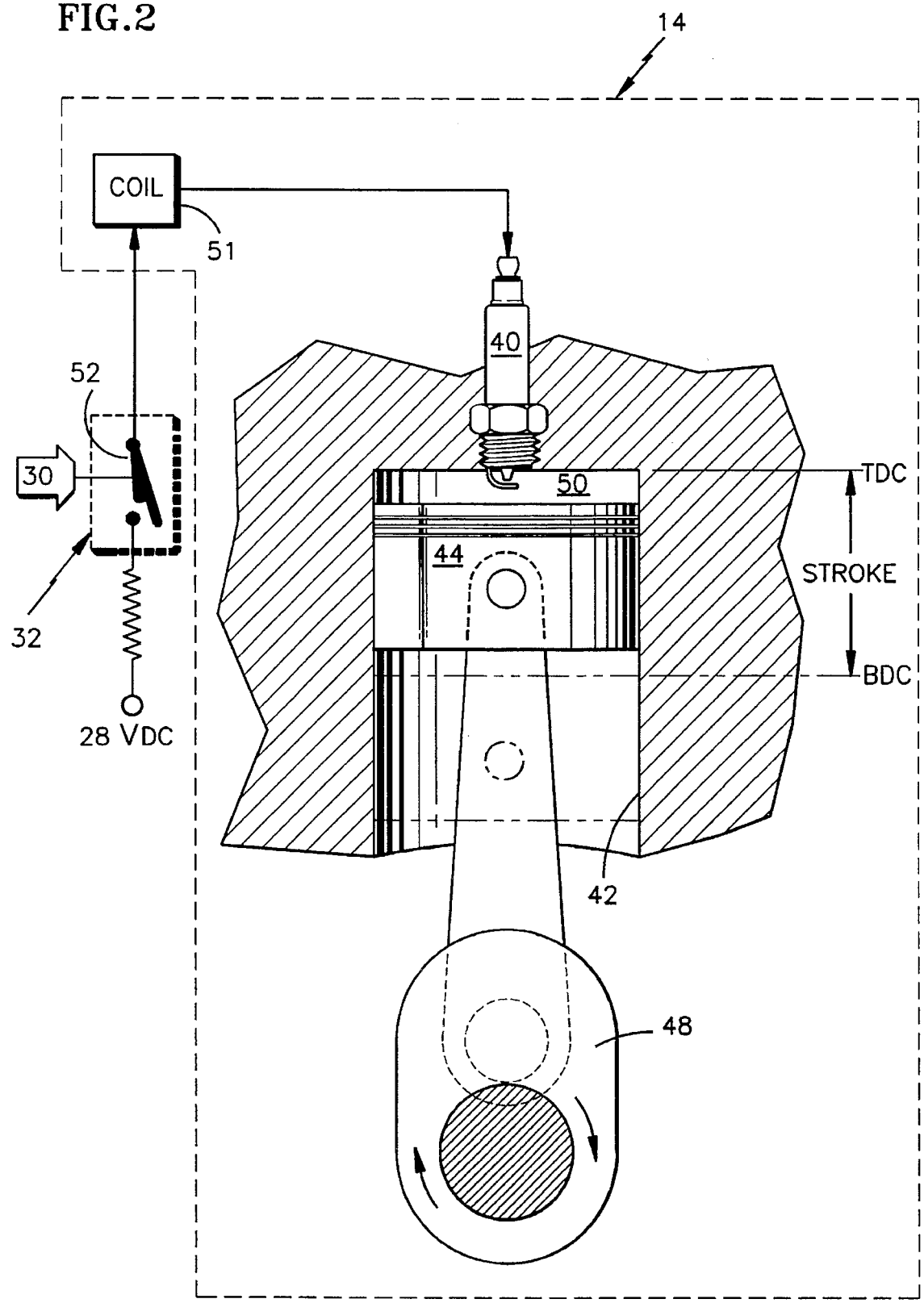
FIG. 2 is a cross-sectional illustration of the cylinder assembly of FIG. 1 along with ignition module.

FIG. 2 illustrates a cross-sectional view of cylinder assembly #1 14 which includes a spark plug 40, a cylinder 42 and a piston 44 mounted to a crank shaft 48. The upward moving piston 44 reduces a volume 50 in the cylinder 42 and compresses the fuel/air mixture within the volume 50. Shortly before the piston 44 reaches top dead center (TDC) the spark plug 40 fires igniting the compressed fuel-air mixture which drives the piston downward. Pre-ignition occurs when the fuel/air mixture within the cylinder is ignited (i.e., the spark plug fires) while the piston 44 is in the early stage of the compression stroke. The cylinder assembly also includes a cam position sensor 22 (FIG. 1) which detects the position of the cam shaft (not shown) and provides the cam shaft position signal on the line 22 indicative of the cam position. The cam shaft (not shown) is linked directly to the crank shaft 48.

In a controlled repetitive sequence, the EEC 12 charges a coil 51 of the next cylinder assembly to fire and once the coil 51 is charged with enough energy, the energy in the coil is rapidly discharged into the spark plug 40. As an example, if cylinder assembly #1 14 is the next cylinder to fire, the EEC 12 commands a switch 52 within ignition module #1 32 to close which initiates the storage of energy. A variable amount of time later, often referred to as the dwell time, the EEC 12 triggers the discharge of the energy in the coil 51 associated with cylinder assembly #1 14.

Figure 3:
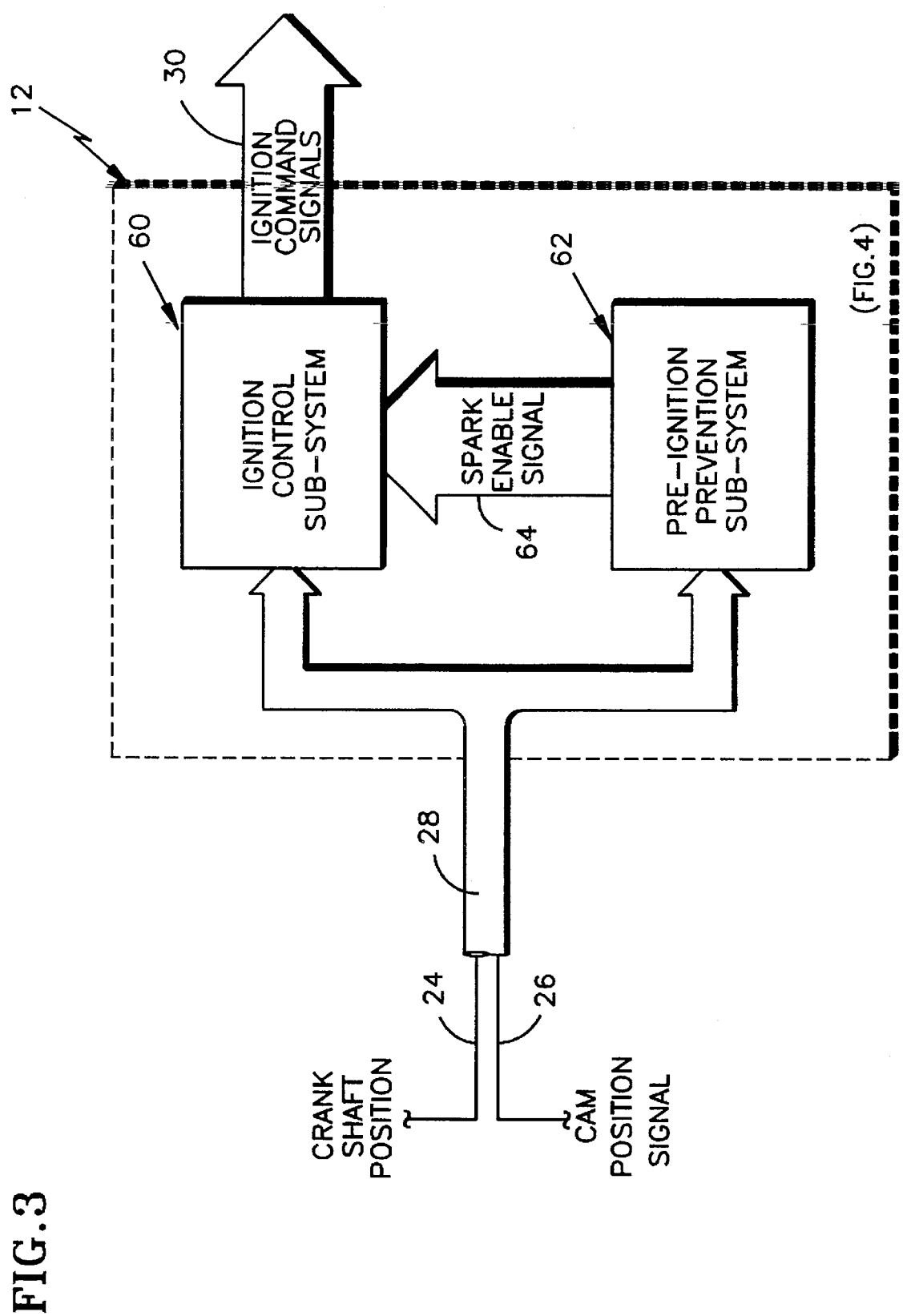
FIG. 3 is a functional block diagram of the electronic engine control (EEC) of the electronic ignition system of FIG. 1.

FIG. 3 illustrates a functional block diagram of the EEC 12 which receives the crank shaft position signal on the line 24 and the cam shaft position signal on the line 26. Both signals are input to an ignition control sub-system 60 and a pre-ignition prevention sub-system 62. The pre-ignition prevention sub-system 62 provides a plurality of spark enable signals on a bus 64 to the ignition control sub-system 60. Each cylinder has its own spark enable signal. The pre-ignition prevention sub-system 62 processes the crank shaft position signal value on the line 24 and the cam shaft position signal value on the line 26 to determine when the piston 44 (FIG. 2) is within the ignition window. The ignition window is defined as the position of the piston within which it is desirable to ignite the fuel/air mixture in the cylinder. As an example, the ignition window may be set within the piston range of −35 degrees before top dead center of the upward compression stroke through 25 degrees top dead center of the downward combustion/power stroke of the piston. Top dead center (TDC) is the point at which the piston is at its full penetration within the cylinder 42. For discussion purposes the ignition window will start at −35 degrees before TDC during the upward compression stroke to 25 degrees after TDC during the downward combustion/ power stroke of the piston. The pre-ignition prevention sub-system 62 acts as a watchdog on the ignition control sub-system 60 to ensure that the spark plugs can only fire within the ignition window. This ensures that a single point failure in the ignition control sub-system 60 will not result in a spark plug being fired outside the ignition window, thus preventing pre-ignition. In general the ignition control sub-system should contain logic which is designed to command a spark plug to fire only in a range outside of the pre-ignition zone where spark firing is optimum for engine performance (e.g., −35 deg TDC to −5 deg TDC). The pre-ignition prevention sub-system 62 then ensures that the command is within ignition window, otherwise the pre-ignition prevention sub-system prevents the ignition control sub-system from firing the spark plug. While one may set the ignition window to a tight range (e.g., −35 deg TDC to —5 deg TDC) the preferred window is nominally twice the width of the desired ignition window to ensure the pre-ignition prevention sub-system 62 does not prevent the ignition control sub-system 60 from preventing ignition when the engine is accelerating.

To ensure a single point failure does not effect both the ignition control sub-system 60 and the pre-ignition control sub-system 62, the two sub-systems 60, 62 should be separate electronic elements to prevent a failure in one sub-system from effecting the performance of the other sub-system. The preferred embodiment of the pre-ignition control sub-system 62 is a separate and independent hardware circuit that generates the spark enable signals on the bus 64. A separate and independent hardware circuit is necessary to satisfy the FAA safety requirements, by ensuring that a failure of the ignition control sub-system 60 will not spuriously generate an active ignition command signal on the bus 30 which commands the spark plug to fire when the piston 44 is outside the ignition window. When active, the ignition command signals on the bus 30 act as the trigger to rapidly discharge the energy in the coil 51 to create a spark across the spark plug 44 (FIG. 2) which ignites the fuel/air mixture in the cylinder volume 50 (FIG. 2).

Figure 4:
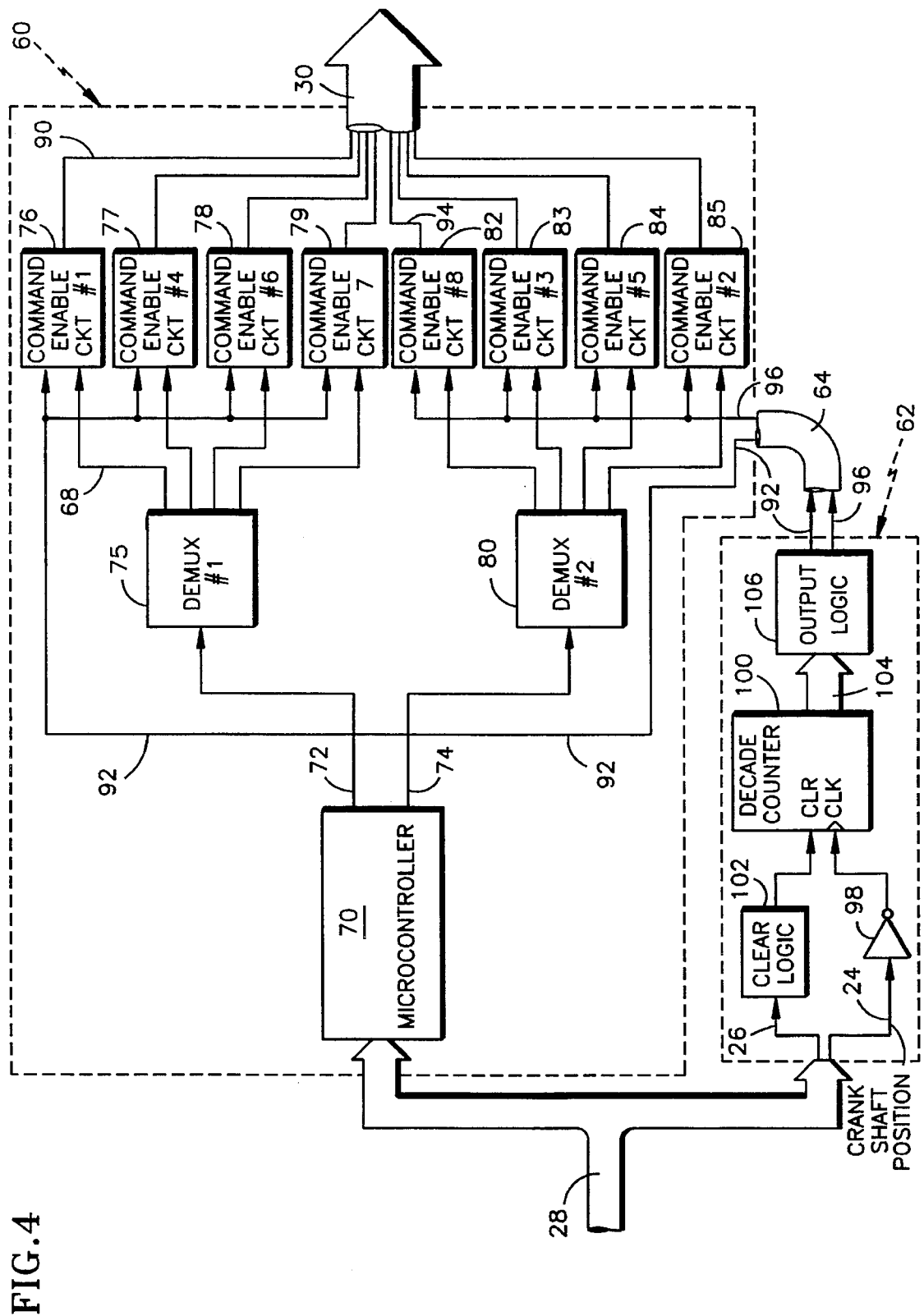
FIG. 4 is a system block diagram of EEC including the ignition control sub-system and pre-ignition prevention sub-system of the EEC of FIG. 3.

FIG. 4 illustrates a more detailed functional block diagram of the ignition control sub-system 60 and the pre-ignition prevention sub-system 62. The ignition control sub-system 60 includes a microcontroller 70 (e.g., a Motorola 68332) responsive to the plurality of the engine and aircraft electrical signals including the crank shaft position signal and the cam shaft position signal on the bus 28. The microcontroller 70 processes signals from the aircraft and engine sensors to generate a bank #1 spark command signal on a line 72 and a bank #2 spark command signal on a line 74. The bank #1 spark enable signal on the line 72 is input to a demultiplexer 75 (e.g., a single integrated circuit model 74HC139AD) which routes the signal as commanded by the microcontroller 70 to one of the command enable circuits 76–79 for cylinder bank #1. Similarly, the bank #2 spark enable signal on the line 74 is input to a demultiplexer 80 which routes the signal to one of the command enable circuits 82–85 for bank #2. Cylinder bank #1 includes cylinders 1, 4, 6 and 7 while cylinder bank #2 includes cylinders 8, 3, 5, and 2. The microcontroller 70 controls the sequence in which the cylinders are fired. As an example, the cylinders may fire in the order: 1, 8, 4, 3, 6, 5, 7 and 2. Therefore the cylinders can be organized into two banks wherein the sequence the cylinders fire alternatively goes between banks #1 and #2. As an example, when the microcontroller wants cylinder #1 to fire, it first issues a high signal (e.g., 5 vdc) for the bank #1 spark command signal on the line 72 and the demultiplexer 75 routes the signal onto a demux output line 68 and into command enable circuit #1 76 which initiates the charging of the cylinder's coil by placing 5 vdc on the ignition command signal line 90 which commands the ignition module to close the switch 52 (FIG. 2) and commence charging of the coil 51 (FIG. 2). A variable amount of time later the value of which is set by the microcontroller, the microcontroller will attempt to command the spark plug to fire. However, the spark plug will only fire if microcontroller commands the spark plug to fire while the bank #1 spark enable signal on a line 92 is also active indicating the piston is within the ignition window. If the bank #1 spark enable signal on the line 92 is not active, the bank #1 command enable circuits 76–79 can not command the spark plug to fire. Therefore, an active ignition command signal can only be issued to a cylinder assembly if the associated spark enable signal is active indicating the piston is within its ignition window.

Once cylinder #1 has fired, the next cylinder to fire is cylinder #8. To fire cylinder #8 the microcontroller issues a high signal on the line 74. The demultiplexer 80 then routes the signal to command enable circuit #8 82 which initiates the charging of the cylinder's coil by placing 5 vdc on the line 94 which commands the cylinder #8 ignition module to start charging the coil 51. A controlled amount of time later (i.e., the dwell time) as set by the microcontroller, the command enable circuit #8 82 will command the spark plug for cylinder #8 to fire if the bank #2 spark enable signal on the line 96 is also active (high). Otherwise, if the bank #2 spark enable signal on the line 96 is not in its active state, the command enable circuits 82–85 are prevented from commanding the spark plugs for cylinder assemblies #8, #3, #5 and #2 to fire. The pre-ignition prevention system does not prevent the coil from charging, but it does prevent the spark plug from firing if the microcontroller attempts to command the spark plug to fire in the pre-ignition zone.

To generate the spark enable signals on the line 92, 96, the pre-ignition prevention sub-system 62 processes both the crank shaft position signal on the line 24 and the cam shaft position signal on the line 26 to determine when the piston is within the ignition window. The crank shaft position signal is input to an inverting buffer 98 and an inverted crank shaft position signal is input to the clock line input of a decade counter 100 (e.g., integrate circuit model 74HC4017AD) such that the counter counts the passing teeth of the crank shaft. The cam shaft position signal on the line 26 is input to a clear logic circuit which issues a clear signal to the decade counter each time the cam shaft has made a complete revolutions. The crank shaft makes two complete revolutions for each revolution of the cam shaft. The cam shaft position signal acts as a synchronization signal which informs the EEC of the position of the pistons. The counter 100 is also cleared upon a power up of the ignition system to ensure it starts counting from a known state. The counter output signals are provided via a bus 104 to an output logic circuit 106 which includes combinational logic to provide the bank #1 spark enable signal on the line 92 and the bank #2 spark enable signal on the line 96. Each of these enable signals is only active (i.e., in a high state) when the next piston to fire within the respective enable signals bank is within its desired ignition window. As an example, when cylinder #1 is the next cylinder scheduled to fire, the pre-ignition prevention sub-system 62 will issue an active bank #1 spark enable signal on the line 92 when the cylinder #1 piston is within the ignition window. If cylinder #8 is the next cylinder to fire, bank #2 spark enable signal on the line 96 is activated when the cylinder #8 piston is within the ignition window. The output logic should be designed such that the spark enable signals on the line 92, 96 can not be active at the same.

Figure 5:
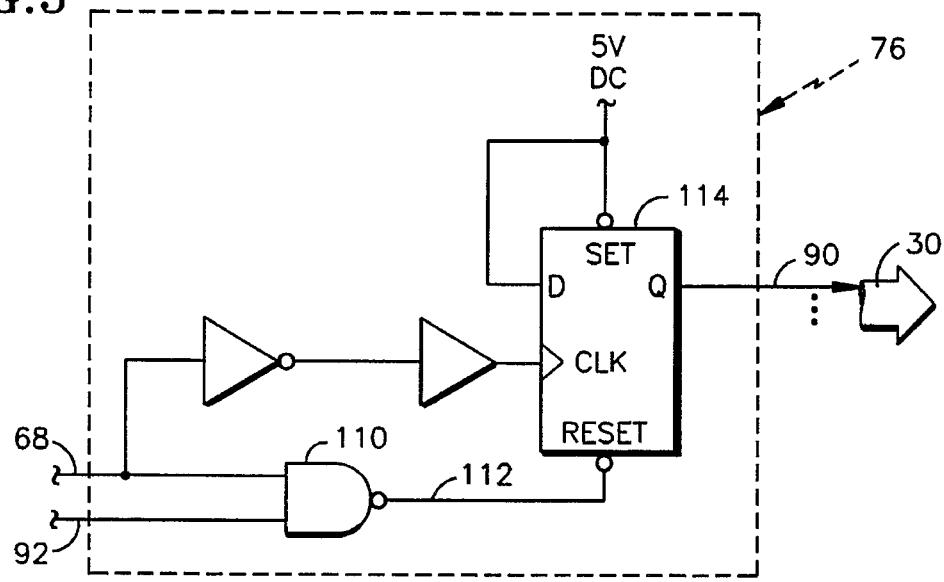
FIG. 5 is an illustration of the command enable circuitry with the ignition control sub-system of FIG. 4.

FIG. 5 illustrates the command enable circuitry #1 76. The command enable circuitry for the other cylinders is similar. Command enable circuitry 76 receives both the spark command signal on the line 68 and the bank #1 spark enable signal on the line 92 and inputs the two signals to a boolean "NAND" gate 110. The output of the NAND gate on a line 112 will be a logical "1" (i.e., 5 vdc) unless the inputs to the NAND gate are both logical "1" at which time the output of the NAND gate on the line will be a logical "0" (i.e., 0 vdc). The NAND gate output signal is input to the reset line of a flip-flop 114 such that the flip-flop is reset when the reset signal on the line 112 is a logical "0" which places a logical "0" on the ignition command signal on the line 90 which is input to the bus 30. A falling edge transition of the ignition command signal (e.g., 5 vdc to 0 vdc) acts as the command to fire the spark plug. When the signal on the line is high (e.g., 5 vdc) the coil is charging.

Figure 6:
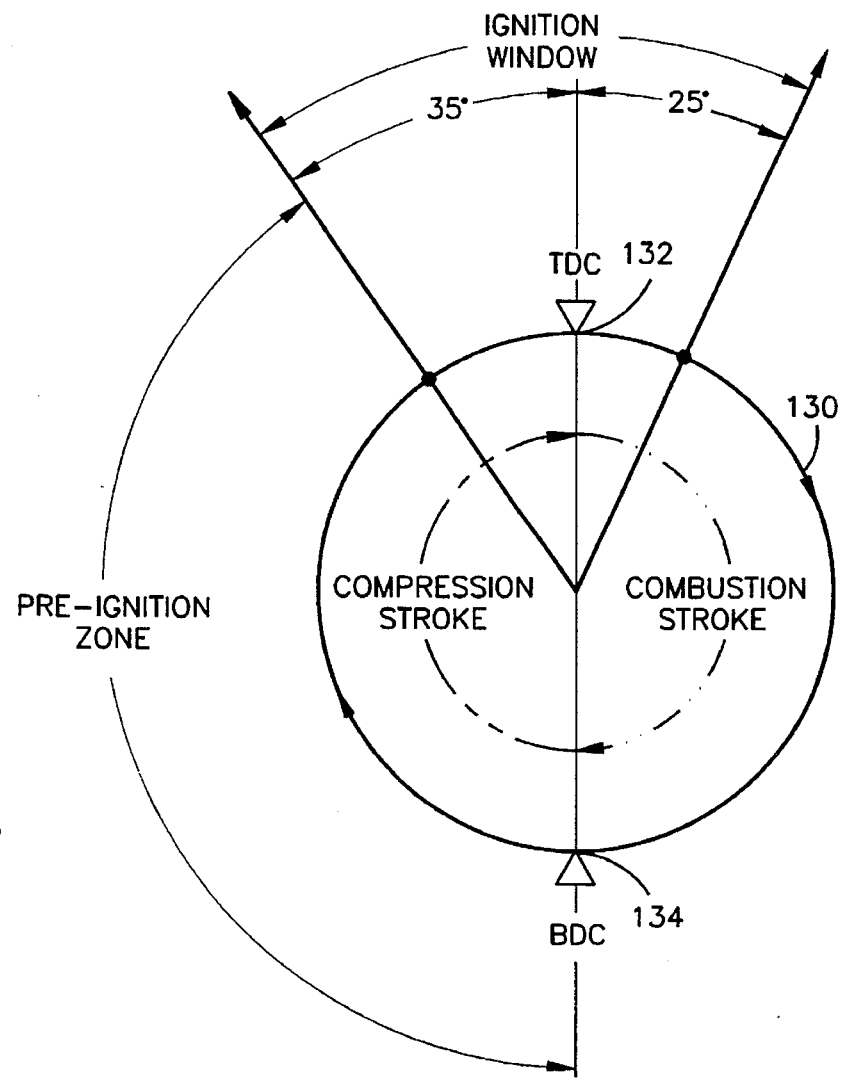
FIG. 6 is a pictorial illustration of the ignition window versus engine crank shaft angle.

FIG. 6 is a pictorial illustration of the ignition window versus engine crank shaft angle. The movement of the crank shaft is plotted along a line 130 wherein the clockwise movement from TDC 132 to bottom-dead-center (BDC) 134 is the combustion stroke and movement from BDC to TDC is the compression stroke. The ignition window is shown as the area beginning at −35 deg prior to TDC through 25 deg after TDC. To prevent pre-ignition, the spark plug should not be fired during the compression stroke outside the ignition window (i.e., the pre-ignition zone). To ensure, pre-ignition can not occur, the pre-ignition prevention sub-system 62 will not allow the ignition control sub-system 60 to command a spark plug to fire when the piston is within the pre-ignition zone. The present invention operates as follows.

FIGS. 7–9 are plots of various signals within the ignition system which demonstrate how the ignition control sub-system 60 and the pre-ignition prevention sub-system 62 of the present invention operate. The axes for FIGS. 7A–7C include crank shaft angle plotted along horizontal axes 150 and voltage plotted along the vertical axes 151. FIG. 7A illustrates a spark command signal on the demux output line 68. Once the signal goes high at crank shaft position $T_1$ the dwell time starts to run and the coil 51 (FIG. 2) begins to charge. When the microcontroller 70 wants to command the spark plug to fire it commands the spark command signal on the line 68 to a low state at crank shaft position $T_2$. However, as discussed herein, the spark plug can only fire if the spark enable signal on the line 92 is active indicating that the piston is within the ignition window. FIG. 7B is a plot of the spark enable signal on the line 92. Since the spark enable signal on the line 92 is active at $T_2$, the command enable circuitry #1 76 will command the spark plug to fire. FIG. 7C is a plot of the ignition command signal on the line 90. At $T_2$ 154 the ignition command signal transitions from the high state to the low state which opens the switch 52 (FIG. 2) and initiates the firing of the spark plug 40 (FIG. 2).

FIG. 8A illustrates a spark command signal on the demux output line 68. Similar to the scenario of FIG. 7A, once the signal goes high at crank shaft position $T_1$ 152 the dwell time starts to run and the coil 51 (FIG. 2) begins to charge. When the microcontroller 70 wants to command the spark plug to fire it commands the spark command signal to a low state at crank shaft position $T_2$ 154. However, as discussed herein, the spark plug can only fire if the spark enable signal on the line 92 is active indicating that the piston is within the ignition window. FIG. 7B is a plot of the spark enable signal on the line 92. Since the spark enable signal on the line 92 is not active at $T_2$, the command enable circuitry #1 76 can not command the spark plug to fire. FIG. 7C is a plot of the ignition command signal on the line 90. At position $T_2$ the ignition command signal remains in the high state and transitions to the low state which opens the switch 52 (FIG. 2) and initiates the firing of the spark plug 40 (FIG. 2) once the spark enable signal on the line 92 goes active at −35 degrees TDC. The command enable circuit #1 76 holds off commanding the spark plug to fire until the piston enters the ignition window at −35 degrees TDC.

FIG. 9A is yet another plot a spark command signal on the demux output line 68. Similar to the scenarios of FIGS. 7A and 8A, once the spark command signal goes high at position $T_1$ the dwell time starts to run and the coil 51 (FIG.

2) begins to charge. When the microcontroller 70 wants to command the spark plug to fire, it commands the spark command signal on a line 68 to a low state at crank shaft position $T_2$. However, as discussed herein, the spark plug can only fire if the spark enable signal on the line 92 is active indicating that the piston is within the ignition window. FIG. 9B is a plot of the spark enable signal on the line 92. Since the spark enable signal on the line 92 is not active at $T_2$, the command enable circuitry #1 76 can not command the spark plug to fire. FIG. 9C is a plot of the ignition command signal on the line 90. At crank shaft position $T_2$ the ignition command signal remains in the high state and the command enable circuit #1 76 does not command the spark plug to fire since the ignition window 160 has closed. The spark plug will then be commanded to fire on the next rising edge of the bank #1 spark enable signal which occurs 120 degrees after the preceding falling edge 162 of the bank #1 spark enable signal.

Although the present invention has been discussed with respect to the embodiments presented herein, one of ordinary skill in the art will appreciate that many design alternatives are available to achieve the pre-ignition prevention of the present invention. As an example, the pre-ignition prevention sub-system could be a microprocessor based system, or any other design which acts as a watchdog over the ignition control sub-system to ensure that the ignition control sub-system can not command a spark plug to fire in the pre-ignition zone. Although the preferred embodiment of the invention employs two demultiplexers, it should be understood that other designs may be used. In fact, it is contemplated that if there are enough available output pins on the microcontroller, a demultiplexor may not be required. In addition, although the ignition window of the present invention has been discussed as the range of −35 degrees TDC to 25 degrees TDC, it should be understood this is just an example based upon the teeth on the crank shaft being located every 30 degrees around the crank shaft starting at be −35 degrees TDC. For instance, if the teeth were mounted every 10 degrees apart for a total of thirty six teeth the ignition window could be 40, 50, 60 or 70 degrees wide.

As used herein, the active state of the spark command signals on the lines 72, 74 and the ignition command signal on the bus 30 are the falling falling trailing edge of the waveform which opens the switch and discharges the energy in the coil to the spark plug to fire the plug.

Although the present invention has been shown and described with respect to a preferred embodiment thereof, it should be understood by those skilled in the art that various other changes, omissions and additions to the form and detail thereto, may be made therein without departing from the scope of the invention.

We claim:

1. An ignition control system for preventing pre-ignition of a reciprocating engine having a plurality of cylinder banks, wherein each cylinder bank includes a plurality of cylinders and each cylinder has an independent ignition module and an ignition coil, said ignition control system comprising:

a control means for generating a spark command signal which has both an active state and an inactive state wherein said spark command signal has a rising leading edge and a falling trailing edge and wherein the rising leading edge indicates the time for the initiation of charging of an ignition coil;

a pre-ignition prevention means for generating a spark enable signal which has both an active state and an inactive state wherein said pre-ignition prevention means for generating said spark enable signal is independent and isolated from said control means for generating said spark command signal;

an ignition enable means responsive to said spark command signal and said spark enable signal for providing an ignition command signal to the independent ignition module for initiating charging the ignition coil of a next cylinder to fire upon detection of the rising leading edge of said spark command signal, and for firing the ignition coil in the next cylinder to fire upon both detection of the falling trailing edge of said spark command signal and said spark enable means being active during or subsequent to said detection of the falling trailing edge of said spark command signal.

2. The ignition system of claim 1 wherein said control means for generating said spark command signal includes a micro controller means for controlling the time between said rising leading edge and said falling trailing edge as a function of the desired charging time of the ignition coil.

3. The ignition system of claim 2 wherein said pre-ignition prevention means for generating said spark enable signal produces a spark enable signal for each of the plurality of cylinders wherein the ignition modules of a first cylinder bank receives a first spark enable signal and wherein the ignition modules of a second cylinder bank receives a second spark enable signal.

4. The ignition system of claim 3 wherein said first spark enable signal is generated so that it is offset from said second spark enable signal thereby alternately enabling between the ignition modules of the first cylinder bank and the ignition modules of the second cylinder bank.

5. A method of preventing pre-ignition in a reciprocating engine having a plurality of cylinders, each cylinder having an independent ignition coil, comprising the steps of:

generating a spark command signal which has both an active state and an inactive state wherein said spark command signal has a rising leading edge and a falling trailing edge and wherein the rising leading edge indicates a time for initiating charging of an ignition coil;

generating a first spark enable signal which has both an active state and an inactive state and wherein said first spark enable signal is generated by hardware independent and isolated from the hardware which generates said spark command signal; and comparing said spark command signal and said first spark enable signal and providing an ignition command signal to the independent ignition module to charge the ignition coil of the next cylinder to fire upon occurrence of the rising leading edge of said spark command signal and providing said ignition command signal to the independent ignition module for firing the ignition coil in the next cylinder to fire .upon occurrence of both the falling trailing edge of said spark command signal and said spark enable means being active during or subsequent to occurrence of the falling trailing edge of said spark command signal.

6. The method of claim 5 wherein said spark command signal is variable so that the time between said rising leading edge and said falling trailing edge varies upon a desired charging time of the ignition module.

7. The method of claim 6 wherein the pulse width of said spark enable signal is variable such that the time duration of the active state varies as a function of the variable amount of time the ignition coil is charged.

8. The method of claim 5 wherein the reciprocating engine has a plurality of cylinder banks, wherein each cylinder bank contains a plurality of cylinders further comprising the step of generating a second spark enable signal which is used as an enable signal for the ignition coils within a first cylinder bank, while said first spark enable signal is used as an enable signal for the ignition coils in a second cylinder bank wherein said first spark enable signal and said second spark enable signal are not active at the same time.

9. An electronic ignition control system responsive to a plurality of sensors for preventing pre-ignition in a reciprocating engine having a plurality of cylinders, comprising:

an ignition control sub-system responsive to signals from the plurality of sensors for controlling ignition of the engine by providing a spark command signal wherein said spark command signal indicates the time for initiating charging and for firing an ignition coil in a next cylinder to fire;

a pre-ignition prevention sub-system, responsive to the signals from the plurality of sensors, for determining when the next cylinder to fire is within a desired ignition window and for providing a spark enable signal which is active when the next cylinder to fire is within the desired ignition window; and an ignition enable circuit for charging and firing the ignition coil in the next cylinder to fire, responsive to said spark command signal for charging and firing the ignition coil in the next cylinder to fire and wherein said ignition enable circuit controls the firing of the ignition coil in the next cylinder to fire by ensuring that the ignition coil can only fire when said spark enable signal becomes active following said spark command indicating a time firing the ignition coil.

10. The electronic ignition control system according to claim 9 wherein said pre-ignition prevention sub-system and said ignition enable circuit are independent hardware components from said ignition control sub-system to ensure a failure in said ignition control sub-system does not degrade the operation of said pre-ignition prevention sub-system and said ignition enable circuit.

11. The electronic ignition control system according to claim 10 wherein said pre-ignition prevention sub-system includes means for determining the position of the piston of the next cylinder to fire and providing said spark enable signal in the active state when the piston is in the ignition window.

12. The electronic ignition control system according to claim 11 wherein said pre-ignition prevention sub-system includes a counter responsive to a crank shaft position signal from said plurality of sensor, wherein said counter determines when the piston is within the ignition window by counting teeth on a crank shaft attached to the piston.

13. The electronic ignition control system according to claim 11 wherein said ignition control sub-system includes a microcontroller which provides said spark command signal.

* * * * *